(12) United States Patent
Gurun et al.

(10) Patent No.: US 8,738,780 B2
(45) Date of Patent: May 27, 2014

(54) SYSTEM AND METHOD FOR HYBRID COMMUNICATION MECHANISM UTILIZING BOTH COMMUNICATION SERVER-BASED AND DIRECT ENDPOINT-TO-ENDPOINT CONNECTIONS

(75) Inventors: Selim Gurun, Goleta, CA (US); Alexander Nickolov, Goleta, CA (US); Mike Zdan, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 843 days.

(21) Appl. No.: 12/357,584

(22) Filed: Jan. 22, 2009

(65) Prior Publication Data

US 2010/0185771 A1   Jul. 22, 2010

(51) Int. Cl.
G06F 15/16    (2006.01)
G06F 15/173   (2006.01)

(52) U.S. Cl.
USPC ........... 709/227; 709/217; 709/225; 709/244; 709/249

(58) Field of Classification Search
USPC ......... 709/203, 217–219, 225–227, 229, 235, 709/237, 241, 244, 249; 726/11, 12; 718/105; 370/237, 395.21
See application file for complete search history.

(56) References Cited

U.S. PATENT DOCUMENTS

| | | | |
|---|---|---|---|
| 5,553,083 A | 9/1996 | Miller | |
| 5,727,002 A | 3/1998 | Miller | |
| 5,764,235 A | 6/1998 | Hunt et al. | |
| 5,826,025 A | 10/1998 | Gramlich | |
| 5,845,265 A | 12/1998 | Woolston | |
| 5,956,027 A | 9/1999 | Krishnamurthy | |
| 6,081,829 A | 6/2000 | Sidana | |
| 6,167,432 A | 12/2000 | Jiang | |
| 6,246,758 B1 | 6/2001 | Low | |
| 6,249,291 B1 | 6/2001 | Popp et al. | |
| 6,343,313 B1 | 1/2002 | Salesky et al. | |
| 7,013,327 B1 | 3/2006 | Hickman et al. | |
| 7,197,535 B2 | 3/2007 | Salesky et al. | |
| 7,310,675 B2 | 12/2007 | Salesky et al. | |
| 7,369,515 B2 | 5/2008 | Salesky et al. | |
| 7,418,476 B2 | 8/2008 | Salesky et al. | |
| 7,426,191 B2 | 9/2008 | Salesky et al. | |
| 7,593,987 B2 | 9/2009 | Salesky et al. | |
| 7,627,663 B2 | 12/2009 | Salesky et al. | |

(Continued)

OTHER PUBLICATIONS

Ford, et al., "Peer-to-Peer communication across network address translators", USENIX Annual Technical Conference, pp. 179-192, (2005).

(Continued)

*Primary Examiner* — Melvin H Pollack
(74) *Attorney, Agent, or Firm* — McDermott Will & Emery LLP

(57) ABSTRACT

A new approach is proposed that contemplates systems and methods to support a hybrid solution that utilizes a centralized communication server as the main mechanism for communication between two clients (endpoints), but augments the server-based communication with an optional direct connection between the two clients whenever available while hiding the complexities and time spent dealing with the direct connection from the clients. The switch of the communication mode between the clients is kept transparent to them during their communication session without causing any inconvenience and/or disruption of the communication. When a direct endpoint to endpoint connection is not available the approach preserves the advantages of connecting through the intermediate communication server.

29 Claims, 7 Drawing Sheets

(56) References Cited

U.S. PATENT DOCUMENTS

| | | | |
|---|---|---|---|
| 7,636,917 B2 * | 12/2009 | Darling et al. | 718/105 |
| 7,649,876 B2 * | 1/2010 | Berg | 370/352 |
| 7,698,453 B2 * | 4/2010 | Samuels et al. | 709/234 |
| 7,706,373 B2 * | 4/2010 | Xu et al. | 370/392 |
| 7,715,331 B2 | 5/2010 | Salesky et al. | |
| 7,716,344 B2 | 5/2010 | Salesky et al. | |
| 7,724,641 B2 * | 5/2010 | Shaffer et al. | 370/216 |
| 7,813,304 B2 | 10/2010 | Salesky et al. | |
| 7,813,334 B2 * | 10/2010 | Dowling | 370/352 |
| 7,822,859 B2 | 10/2010 | Salesky et al. | |
| 7,836,163 B2 | 11/2010 | Salesky et al. | |
| 7,877,489 B2 | 1/2011 | Salesky et al. | |
| 7,916,682 B2 * | 3/2011 | Nagarajan et al. | 370/321 |
| 7,934,002 B2 | 4/2011 | Salesky et al. | |
| 2003/0140159 A1 | 7/2003 | Campbell | |
| 2009/0064304 A1 * | 3/2009 | Cohen et al. | 726/11 |
| 2010/0274848 A1 * | 10/2010 | Altmaier et al. | 709/203 |
| 2010/0306674 A1 | 12/2010 | Salesky et al. | |
| 2010/0318665 A1 * | 12/2010 | Demmer et al. | 709/227 |

OTHER PUBLICATIONS

"ORCA Video Conferencing System", Manual Written by the National Oceanic and Atmospheric Administration's Office of Ocean Resources Conservation and Assessment for Operation of the CU-SeeMe System, 26 pages (1995).

Sattler, "Internet TV with CU-SeeMe", Book, 323 pages (1995).

U.S. Appl. No. 09/523,315, filed Mar. 10, 2000, Salesky.

U.S. Appl. No. 60/014,242, filed Mar. 26, 1996, Salesky.

"CU-SeeMe Software Product," Brought to you by the Cu-SeeMe Development Team of the Advanced Technologies and Planning group of the Network Resources Division of Cornell Information Technologies, pp. 1-8 (1995).

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic+XTV=CoReview," Computer Networks and ISDN Systems, pp. 1-19 1995.

McCanne et al., "Receiver-Driven Layered Multicast," ACM SIGCOMM, pp. 1-14 (1996).

Savetz et al., "MBONE: Multicasting Tomorrow's Internet," IDG Books Worldwide, Inc., (1996).

US 5,715,404, 02/1998, Katseff et al. (withdrawn)

* cited by examiner

DC: direct connection
CS: connection through the communication server

US 8,738,780 B2

SYSTEM AND METHOD FOR HYBRID COMMUNICATION MECHANISM UTILIZING BOTH COMMUNICATION SERVER-BASED AND DIRECT ENDPOINT-TO-ENDPOINT CONNECTIONS

BACKGROUND

Using a communication server to connect two clients, such as a host and a client endpoint trying to access the host remotely, is a powerful mechanism for avoiding various kinds of network and firewall setup hurdles. Such server-based connections enable a user of a service provided by the host to enjoy plug-and-play experience from any machine on the Internet with simple host installation. However, there are costs associated with using the intermediate communication server—all traffic goes through the server, thus increasing the load on the server and the burden on network utilization. Furthermore, latency can potentially be higher than endpoint to endpoint connections (also commonly known as "direct connections" or "point to point connections") between the clients, thus reducing the perceived speed of the service. Direct connections on the other hand, while possessing many desirable characteristics, such as network efficiency with little server involvement, can be complex and relatively time consuming to setup and maintain. Currently, some communication schemes adopt a combined approach, which attempts to establish a direct endpoint to endpoint connection first and only falls back to using an intermediate server when the direct connection fails. Such direct-connection-oriented approach suffers from the same problems as described above.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support a hybrid solution that utilizes a centralized communication server as the main mechanism for communication between two clients (endpoints), but augments the server-based communication with an optional direct connection between the two clients whenever available while hiding the complexities and time spent dealing with the direct connection from the clients. The switch of the communication mode between the clients is kept transparent to them during their communication session without causing any inconvenience and/or disruption of the communication. Using direct endpoint to endpoint connection when available has the benefits of reducing data traffic through the communication server, the amount of Internet bandwidth, and perceived latency for critical data traffic. When a direct endpoint to endpoint connection is not available (due to, for a non-limiting example, customer network configurations), the approach preserves the advantages of connecting through the intermediate communication server, wherein such advantages include but are not limited to, secured centralized management, firewall-friendly, simple host installation, ease-of-use (plug-and-play) experience, potentially faster initial connection times, etc.

Figure 1:
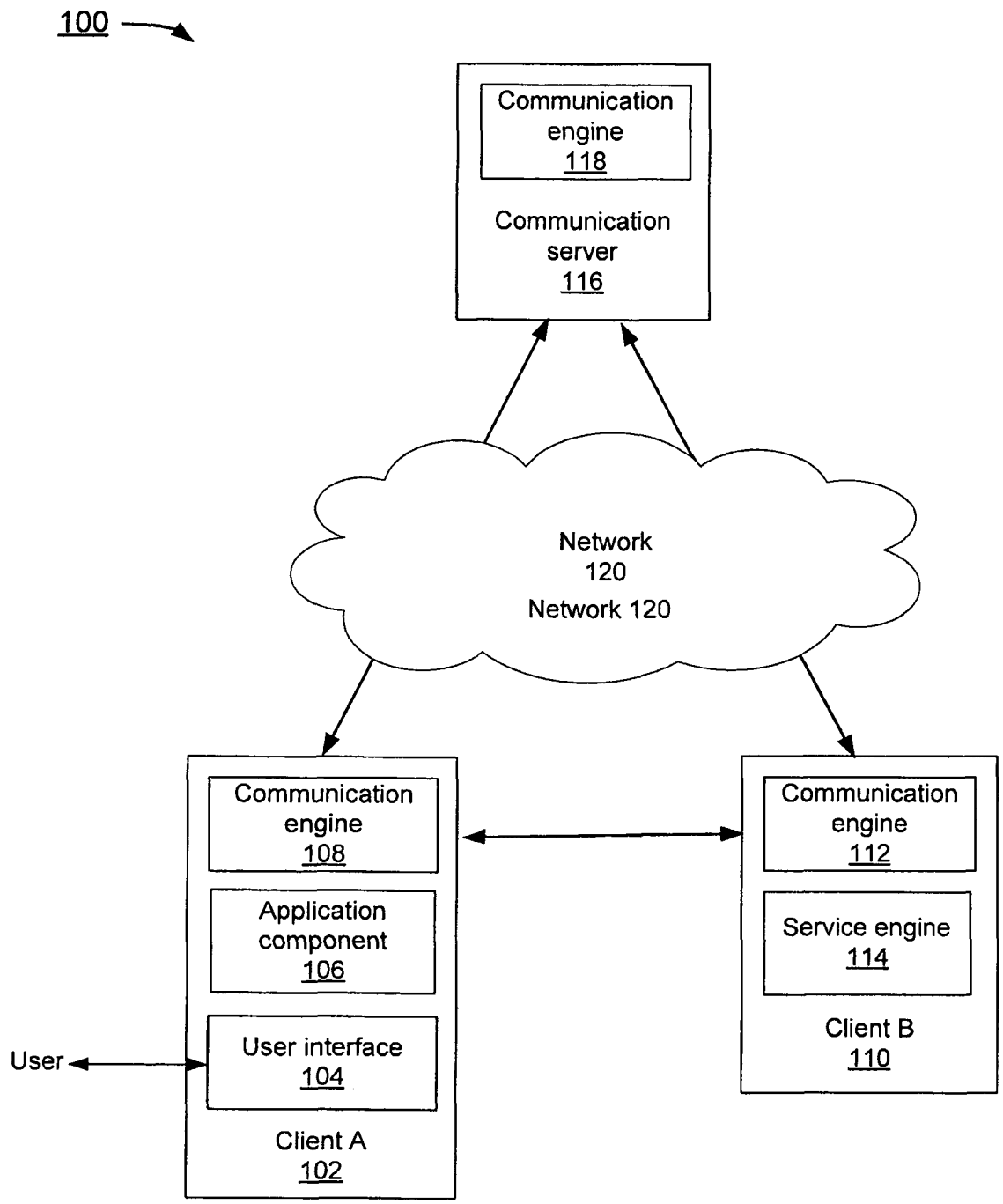
FIG. 1 depicts an example of a diagram of system to support hybrid communication mechanism utilizing both server-based and direct endpoint-endpoint connections.

FIG. 1 depicts an example of a diagram of system 100 to support hybrid communication mechanism utilizing both server-based and direct endpoint-endpoint connections. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes client (endpoint) A 102, which includes at least a user interface 104, an application component 106, and a communication engine 108; client (endpoint) B 110, which includes at least a communication engine 112 and a service engine 114; a communication server 116, which includes at least a communication engine 118; and a network 120.

As used herein, the term "engine", "component", or "interface" refers to a software, firmware, hardware, or other component that is used to effectuate a purpose. The engine, component, or interface will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the client/endpoint A 102, client/endpoint B 110, and communication server 116 can be a computing device, a communication device, a storage device, or any electronic device capable of running a software component. For non-limiting examples, a computing device can be but is not limited to, a laptop PC, a desktop PC, a tablet PC, an iPod, a PDA, or a server machine. A storage device can be but is not limited to a hard disk drive, a flash memory drive, or any portable storage device. A communication device can be but is not limited to a mobile phone.

In the example of FIG. 1, the communication engines 108, 112, and 118 are software components that enable the client A 102, client B 110, and communication server 116 to communicate with each other following certain communication protocols, such as TCP/IP protocol, or a modified version of such protocols as discussed later. For non-limiting examples, a communication engine on one of the devices (endpoints or servers) may issue instructions to start a process to initiate, accept, establish, and maintain a connection with another device for data transmission between the devices.

In the example of FIG. 1, the network 120 enables the client A 102, client B 110, and communication server 116 to communicate and interact with each other via their respective communication engines 108, 112, and 118. Here, the network 120 can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network are well known to those of skill in the art.

In the example of FIG. 1, the application component 106 on client A 102 is a client-side software component, which for a non-limiting example, can be a stub or plug-in that enables a user to initiate an access to a service provided by a hosting device such as client B 110 remotely over the network 120. Accordingly, service engine 114 is a software component running on client B 110 that is able to provide a service accessible or deliverable to a client application such as the application component 106 on client A 102 over the network 120. The user interface 104 is a software component that enables a user to interact with client A 102 and to access the service provided by client B via the application component 106. The structure and function of such client-server relationship among, the user interface 104, the application component 106, and service engine 114 are known to one skilled in the art.

While the system 100 depicted in FIG. 1 is in operation, a user at endpoint client A 102 may enable a user to initiate an access to a service hosted and provided by service engine 114 on a remote service provider—endpoint client B 110, by launching application component 106 via user interface 104 on client A 102. Each of the application component 106 on client A 102 and the service engine 114 on client B 110 then independently establishes a first and a second connections to the communication server 116 via communication engines 108, 112, and 118, respectively. Once both client A 102 and client B 110 are connected to the communication server 116 (i.e., both the first and the second connections are accepted by the communication server 116), a communication is established between the two endpoints and the endpoints are considered "in session", i.e., the user can start to use the service provided remotely by the service engine 114 of client B 110. While client A 102 and client B 110 are in session, a process is initiated in the background by one of them to establish a direct connection between the two endpoints without interrupting the user's ongoing service experience. More specifically, both client A 102 and client B 110 first provide detailed information about their IP addresses to the communication server 116. The communication server 116 then relays the address of client A 102 to client B 110 and vice versa. The communication server 116 can also select and inform either of the two endpoints as the initiator of the direct connection and the non-initiating endpoint will collaborate with the initiating endpoint during the process of establishing the direct connection. The communication server 116 can also select and inform both of the endpoints simultaneously as the initiator of the direct connection, and both initiating endpoints will collaborate during the process of establishing the direct connection. Once their IP addresses have been exchanged, the two endpoints 102 and 110 collaborate with each other to establish a direct connection between them via TCP hole-punching to be discussed in details later. If the direct connection between the endpoints client A 102 and client B 110 cannot be established due to, for non-limiting examples, network configurations/conditions, the user's session is not affected and the user can continue to use the service provided by the service engine 114 on client B 110 via the original connections through the communication server 116. If, on the other hand, a direct connection can be established between the two endpoints 102 and 110, the direct connection remains idle, i.e., all of the service traffic between the two endpoints continues to flow through their connections with communication server 116, until one of the endpoints switches the communication to the established direct connection instead of the server connections using a modified communication protocol to be discussed in details later. As a result of the switch, the user at client A 102 is now experiencing the service provided by the service engine 114 on client B 110 with data flowing over the direct connection between the two client endpoints. Although the data communicated between the two endpoints no longer flows through the communication server 116, saving bandwidth and capacity at server 116 and leading to better perceived latency and/or performance by the user, the two endpoints 102 and 110 still maintain their separate connections with the communication server 116 (which are now quiescent), respectively. Later, if the direct connection between the two endpoints 102 and 110 breaks down for any reason, the user's session data will be switched back over to the original first and second connections between the endpoints and communication server 116 automatically and seamlessly with no disruption to the user's experience of the service provided by the service engine 114 on client B 110. Alternatively, the two endpoints 102 and 110 may attempt to quickly re-establish their respective connections with the communication server 116 first if, for a non-limiting example, one or more of their original first and second connections with the communication server 116 are not viable. The two endpoints 102 and 110 may later either attempt to re-establish another direct connection between them or just let the session continue using the existing first and second connections through communication server 116. Similarly, if the server connection between the endpoints and communications server 116 breaks, the endpoints may re-establish the communication with the server 116 without disruption to the user's experience. When both the direct connection and the server connection between the two endpoints are viable, the decision to switch back and forth between the two communication modes can be based on one or more factors that include but are not limited to network metrics, observations, bandwidth usage limits, etc.

Figure 2:
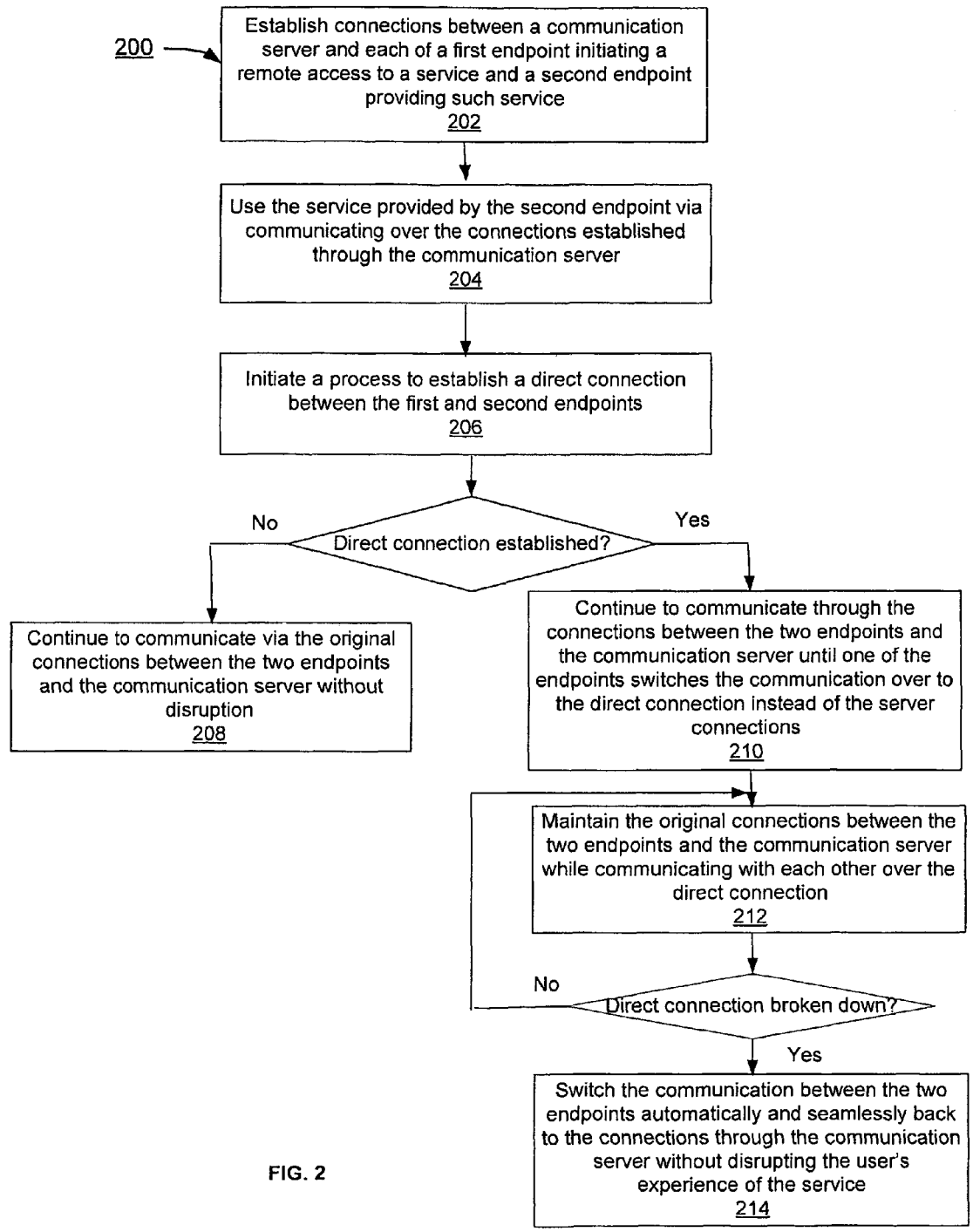
FIG. 2 depicts a flowchart of an example of a process to support hybrid communication mechanism utilizing both server-based and direct endpoint-endpoint connections.

FIG. 2 depicts a flowchart of an example of a process 200 to support hybrid communication mechanism utilizing both server-based and direct endpoint-endpoint connections. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where each of a first endpoint initiating a remote access to a service and a second endpoint providing such service establishes a connection with a communication server. The flowchart 200 continues to block 204 where a user at the first endpoint starts to use the service provided by the second endpoint via the connections established through the communication server. The flowchart 200 continues to block 206 where a process is initiated to establish a direct connection between the first and second endpoints. If such direct connection cannot be established, the flowchart 200 continues to block 208 where the first and second endpoints continue to communicate via their original connections through the communication server. If a direct connection between the first and the second endpoints can be established, the flowchart 200 continues to block 210 where the two endpoints continues to communicate through the connections with the communication server until one of the endpoints switches the communication over to the direct connection instead of the server connections. The flowchart 200 continues to block 212 where the two endpoints maintain their original connections with the communication server with communicating with each other over the direct connection while still. If the direct connection between the endpoints breaks down, the flowchart 200 ends at block 214 where the communication between the two endpoints is automatically and seamlessly switched back to the connections through the communication server without disrupting the user's experience of the service.

NAT/TCP Hole Punching

Figure 3A:
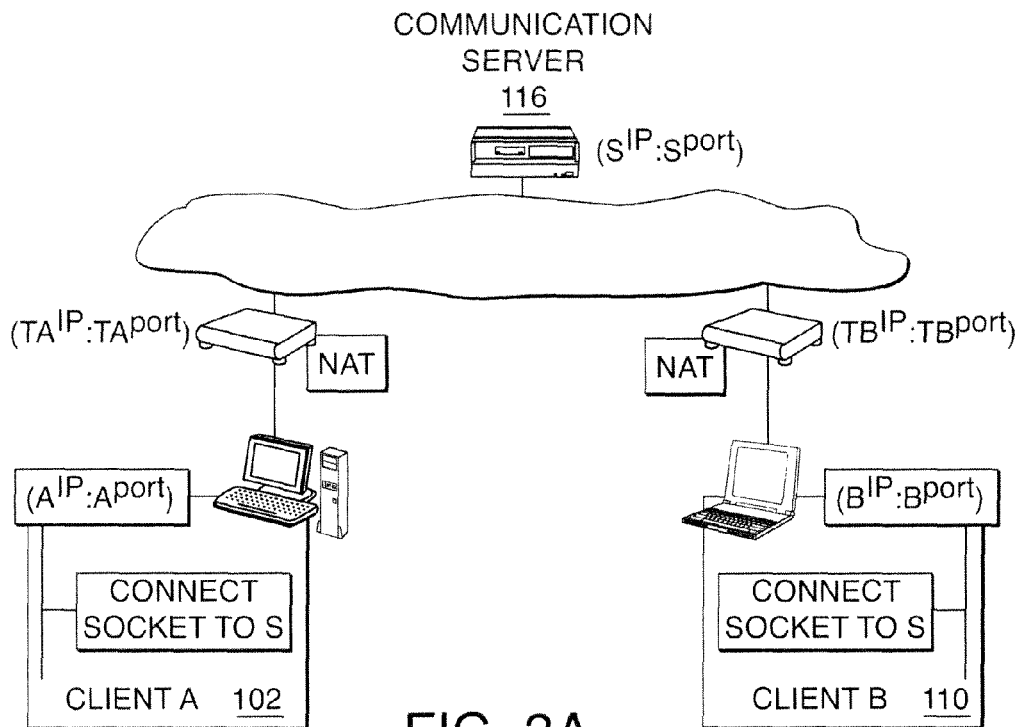
FIG. 3(*a*)-(*f*) depict an example of a process to establish a direct connection between endpoints behind respective LANs via "NAT/TCP hole punching."

In some embodiments, either or both of the endpoints 102 and 110 may reside in a Local Area Network (LAN) behind their respective Network Address Translation devices (NATs) as shown in FIG. 3(a). Here, NATs provide a way to create a private network address space within the LAN of an endpoint by assigning private IP address to an endpoint within a LAN and dynamically translating the private IP address into external (public) addresses accessible over the Internet and thus hiding internal network configurations of the LAN from outside entities. The (public or private) IP address of each of the endpoints, NATs, and communication server includes a pair of address within a network plus a port of the entity available for communication.

The problem with many NATs is that they do not allow "unsolicited" incoming connections. Consequently, the only way for two endpoints such as client A 102 and client B 110 that are behind two separate NATs to connect to each other directly is to let (at least) one of the NATs to believe that an incoming connection is solicited. To this end, the endpoints 102 and 110 need to know the public and/or private IP addresses of one another in order of the direct connection to be established.

Figure 3B:
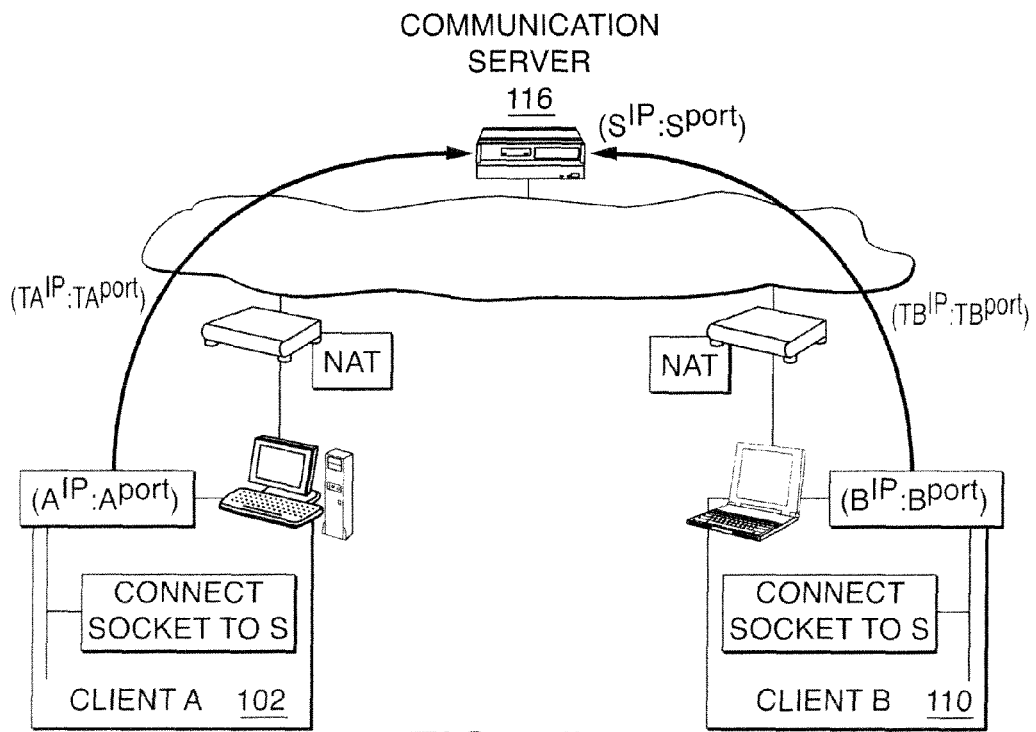
Figure 3C:
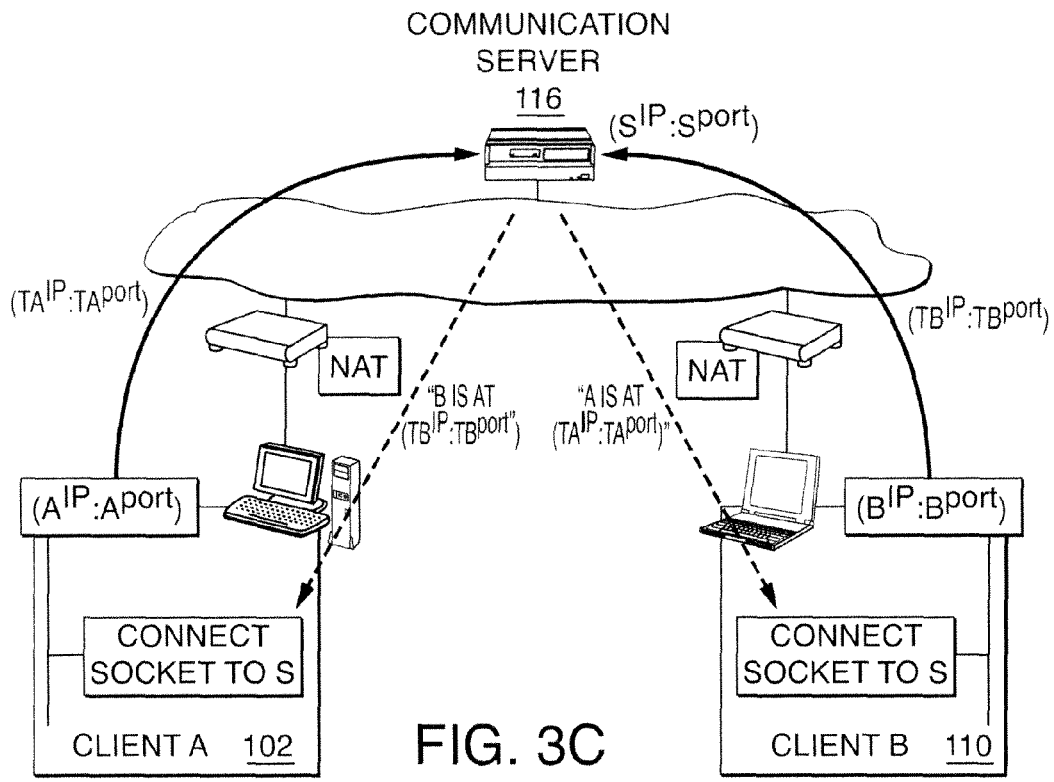
Figure 3D:
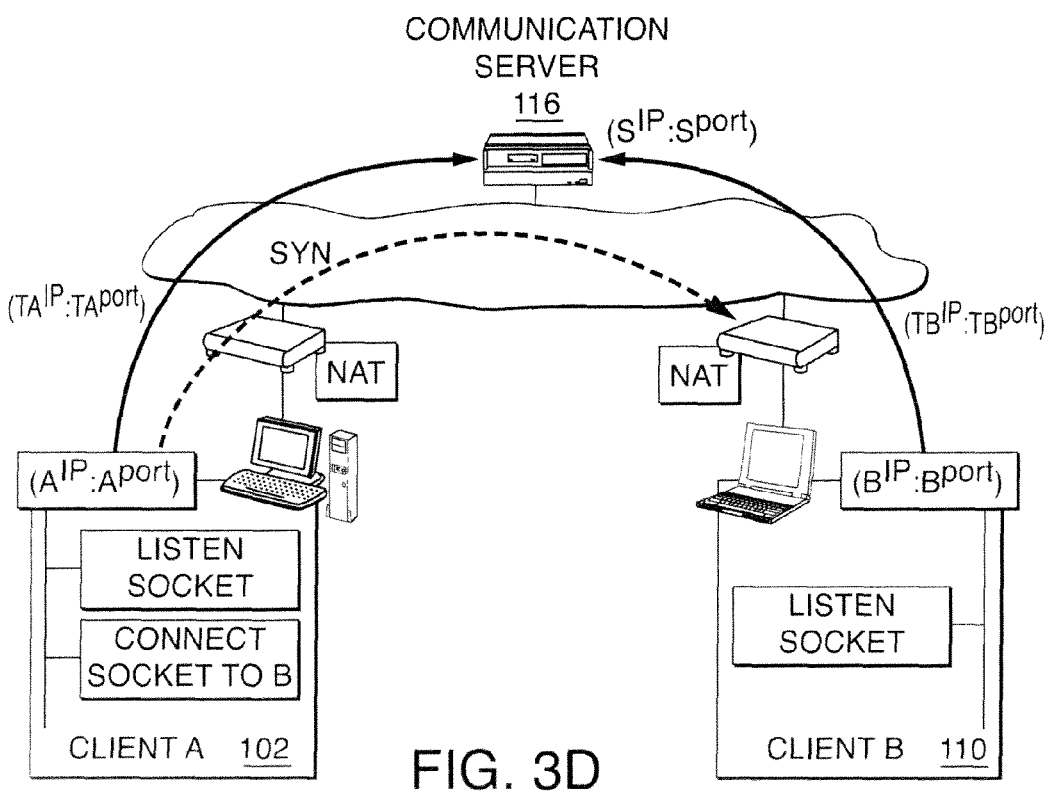
Figure 3E:
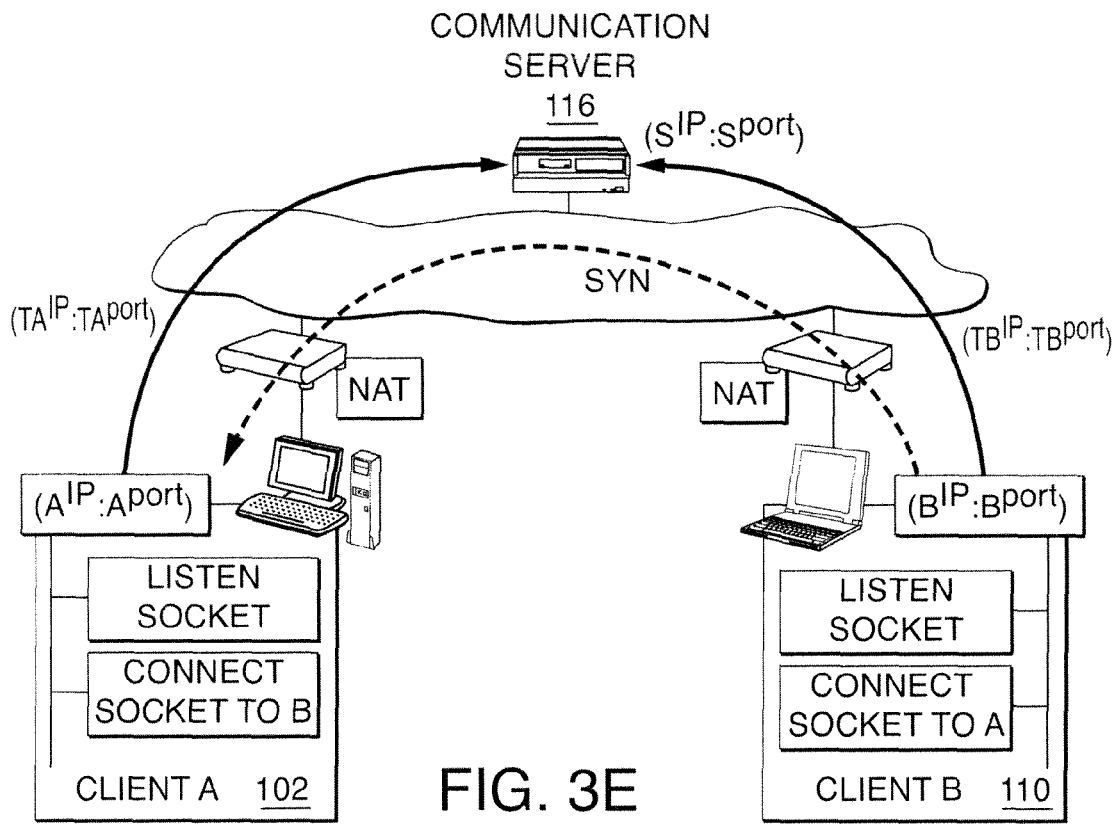
Figure 3F:
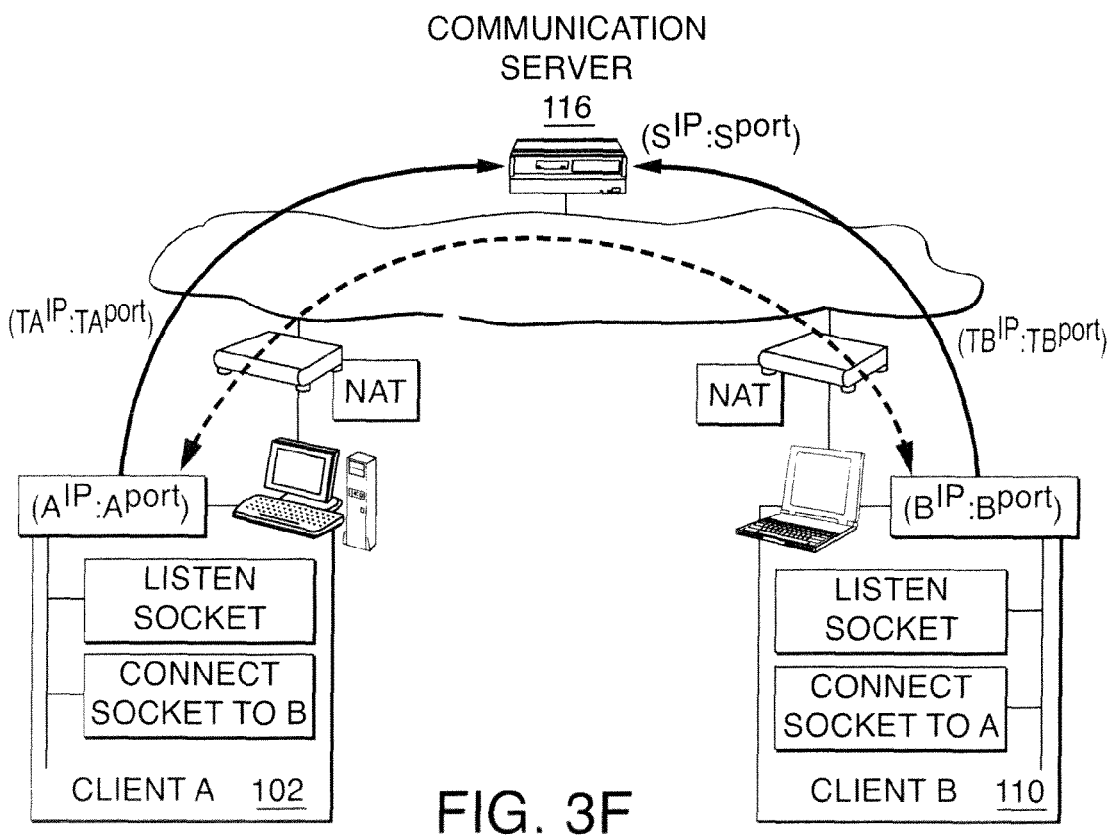

FIG. 3(b)-(f) depict an example of a process to establish a direct connection between endpoints 102 and 110 via, for a non-limiting example, "NAT/TCP hole punching." Note that the "NAT/TCP hole punching" described herein is just one example of a method of establishing direct TCP socket connections between the endpoints and the hybrid communication mechanism described above applies to other methods of establishing direct connections as well. Assuming both NATs are directly connected to the Internet and the communication server with a public IP address is available, both the endpoints 102 and 110 will open connections independently to the communication server 116 (in no pre-determined order) and provides detailed information of their respective private IP addresses (e.g., $<A^{ip}, A^{port}>$ and $<B^{ip}, B^{port}>$) as well as their public addresses (e.g., $<TA^{ip}, TA^{port}>$ and $<TB^{ip}, TB^{port}>$ of their respective NATs) to the communication server 116 at $<S^{ip}, S^{port}>$ as shown in FIG. 3(b). Once addresses of both of the endpoints have been received, the communication server 116 will then relay the private as well as public addresses of endpoint 102 to endpoint 110 and vice versa as shown in FIG. 3(c) so that the endpoints can initiate direct connection to the external address (i.e. $TA^{ip}$, $TA^{port}$) of one another. The communication server 116 may decide which of the two endpoints will initiate a direct connection with the other. When client A at endpoint 102 is selected to start the direct connection attempt with endpoint 110 following the TCP protocol, it initiates a connection request (an SYN message) by the NAT of client B at endpoint 110 as shown in FIG. 3(d). Although the message does not reach client B inside its LAN, a state ("hole") is created at endpoint 102's NAT as a consequence of the connection request. Consequently, when client B 110 collaborates with client A 102 by trying to connect to the client A 102, its unsolicited SYN messages pass through the NAT of endpoint 102 as shown in FIG. 3(e) because the endpoint 102's NAT regards this SYN(s) as part of the previous connection initiated by endpoint 102 and hence "solicited". Thus, a direct connection can be established between the two client endpoints 102 and 110 following TCP handshaking protocols (whereby the endpoints exchange "ACK" and "SYN" messages back and forth) as shown in FIG. 3 (f) by "tricking" their NAT(s) to allow the unsolicited incoming messages and data. Note that establishing such direct connection may require the two endpoints to authenticate each other first in order to thwart mistaken connections (for a non-limiting example, a random machine in endpoint 102's LAN might have the same private address as endpoint 110's private address and endpoint 102 should not to connect to this random machine).

In some embodiments, the endpoint 102 first tries to contact endpoint 110 at its private address before its public address. This way, the two endpoints can establish the direct connection and communicate with each other directly without going through any external NAT or server when both endpoints are behind the same NAT (i.e., they are in the same LAN). If endpoint 102 does not initiate the direct connection attempt immediately, the non-initiating endpoint 110 may wait for a certain period of time before initiating a direct connection attempt of its own.

Switching of Communication Mode

Figure 4:
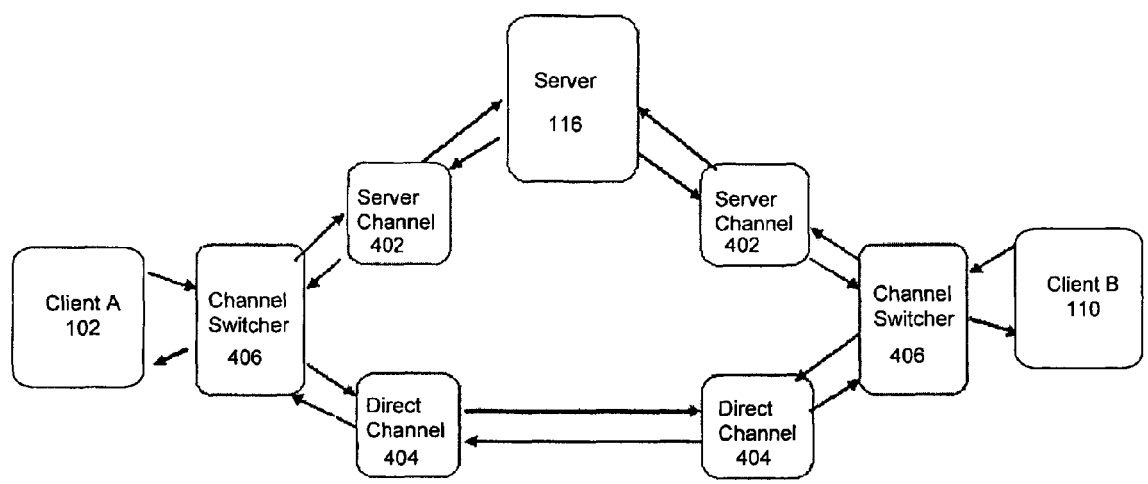
FIG. 4 depicts an example of a channel switching component implemented on two endpoints for switching of communication mode between the endpoints.

In some embodiments, a new Channel Switcher 406 is introduced into the communication protocol used among the endpoints 102 and 110 and the communication server 116, wherein the Channel Switcher 406 is a channel switching component implemented on each or either of endpoints 102 and 110 as shown in FIG. 4, to switch between the two communication modes—one directly between the endpoints, the other through the communication server 116. Apart from the Server Channel 402 that support separate connections between the endpoints 102 and 110 and the communication server 106, the Channel Switcher 406 also supports Direct Channel 404 that allow the endpoints 102 and 110 to communicate directly with each other, i.e., each Channel Switcher 406 see two paths to access from one endpoint to another.

The communication between the endpoints first starts with the server-based connection, and at some point the second direct connection becomes active. The Channel Switcher 406 switches the communication mode from the first to the second, and then, in case of difficulties, reverts back to the first. More specifically, the Channel Switcher 406 is responsible for at least one or more of: attempting direct connections between the endpoints 102 and 110, setting up a Direct Channel 404 if a direct connection is successful, and re-direct the read( ) and write( ) calls from the upper layer of communication protocol adopted to the appropriate Channel (e.g., Server Channel 402 or Direct Channel 404).

In some embodiments, the Channel Switcher 406 creates a new component (Direct Connector), which does the TCP/NAT hole punching discussed above and hands back a socket or object, if the direct connection attempt is successful, to the Channel Switcher 406 for the purpose of creating the Direct Channel 404 for the initiating endpoint to talk directly to the other (non-initiating) endpoint. Here, the socket is a general interface that is implemented by classes that provide direct connection functionality. For a non-limiting example, the actual NAT hole punching algorithm can be used to implement the socket.

In some embodiments, the Direct Connector component waits a certain period of time or activity before initiating the direct connection setup process behind the scenes to make sure that the two endpoints are initially communicating with each other via the Server Channel 402. In the meantime, the Server Channel 402 may still send packets to ping the communication server 116 in order to let the communication server 116 know that the endpoints are still alive and thus avoiding the possibility of communication server 116 sensing the endpoints as idle and disconnecting them.

One of the crucial aspects of using direct connections between the two endpoints 102 and 110 is to switch the communication mode from using server-based connections of Server Channel 402 to the direct connection of Direct Channel 404 if the direct connection is successfully established, and then back to the Server Channel 404 when necessary. The difficulty stems from the fact that blindly switching results in re-ordering of packets, causing protocol errors at the application and session layers that result in connection failure between endpoints because of out of order packets.

In some embodiments, a "SWITCH" packet is utilized, which would explicitly inform one endpoint about the intention of the other endpoint to switch from Server Channel 402 to Direct Channel 404. More specifically, the switching from server-based connections to the direct connection can be done in two phases: First, whenever an endpoint decides to switch from server-based communication to direct endpoint-endpoint communication after a direct connection has been successfully established between the two endpoints, the Channel Switcher 406 sends a "SWITCH" packet to the other endpoint via the communication server 116. Then, the switching endpoint immediately switches to using the Direct Channel 404 for write( ) packets only, while continuing to use the Server Channel for read( ) packets. When the other (non-switching) endpoint receives the SWITCH packet from its Server Channel, it immediately starts using the Direct Channel for read( ) packets. Such a two-step process guarantees that the non-switching endpoint receives all the required data packets of the switching endpoint from the Server Channel 402 and then only switches to use Direct Channel 404 for receiving all the subsequent packets of the switching endpoint after the "switch".

Figure 5:
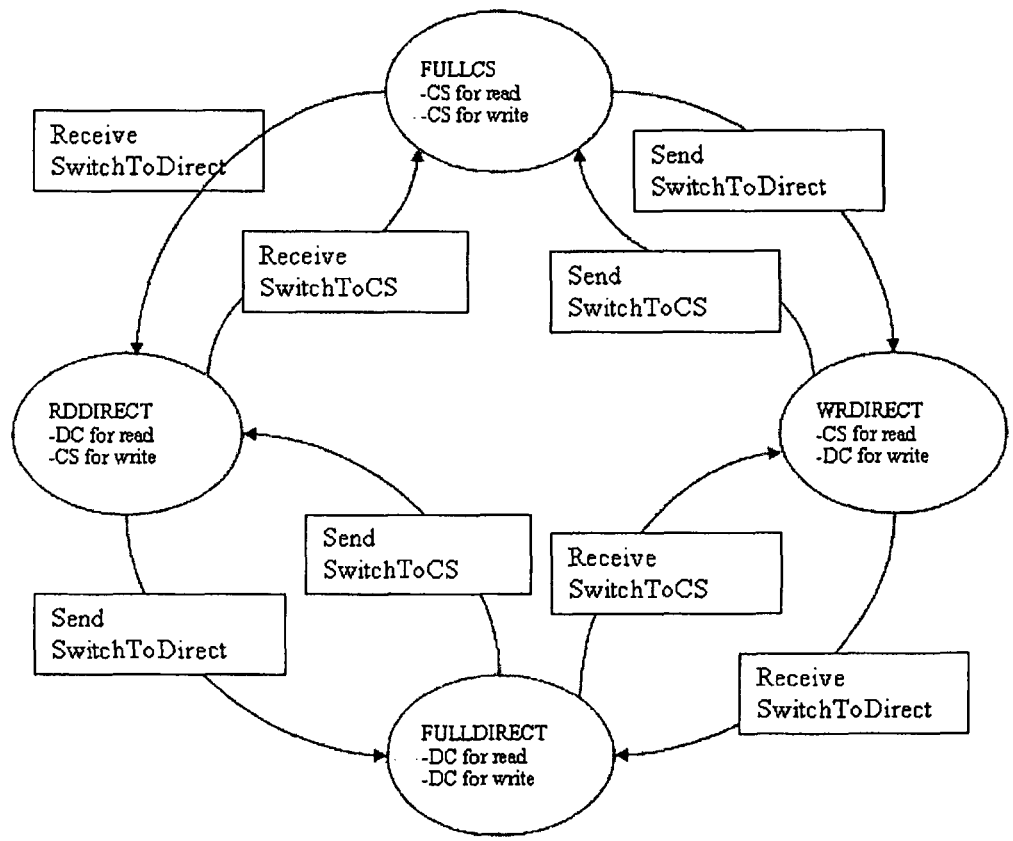
FIG. 5 depicts an example of a state machine utilized of the purpose of switching communication mode between the two endpoints in FIG. 4.

In some embodiments, since the switching process happens independently at both endpoints, a state machine as shown in FIG. 5 can be utilized for the purpose of identifying the appropriate channel to use for read( ) and write( ) packets and to decide when an endpoint can stop using the Server Channel 402 and completely switch (both write( ) and read( )) to Direct Channel 404. More specifically, the state machine in FIG. 5 has at least four states: FULLCS, RDDIRECT, WRDIRECT, and FULLDIRECT. In FULLCS state, both the read( ) and write( ) packets are sent between the endpoints via the communication server 116. In RDDIRECT state, the read( ) packets are sent to the other endpoint using the direct connection, while the write( ) packets are still sent through the communication server 116 as discussed above. Similarly, in WRDIRECT state, the write( ) packets are sent to the other endpoint using direct connection, while the read( ) packets are sent through the communication server 116. Finally, in FULLDIRECT state, both read( ) and write( ) packets are sent using the direct connection. The transitions among the states are triggered by actions on the switch packet, i.e., a state change occurs when a switch packet is sent or received. Receiving the switch packet causes the receiving endpoint to switch the connection that it current uses for write operations. Similarly, sending a switch packet causes the sending endpoint to switch the connection that it current uses for read operations. Note that the transitions among the states in the state machine in FIG. 5 will either be from FULLCS to FULLDIRECT, or from FULLDIRECT to FULLCS, while RDDIRECT and WRDIRECT will act as transition states.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a communication server, which in operation,
accepts a first connection with a first endpoint and a second connection with a second endpoint, respectively;
enables the first and the second endpoints to establish a communication with each other via the first and the second connections;
said first endpoint, which in operation, enables a user to access a service provided remotely by the second endpoint over a network by:
establishing said first connection with the communication server;
communicating with the second endpoint via the first connection established with the communication server;
initiating a process to establish a direct connection with the second endpoint;
switching the communication with the second endpoint from the first connection with the communication server to the direct connection with the second endpoint if such direct connection is established, while maintaining the first connection with the communication server;
said second endpoint, which in operation, provides the service to the user over the network by:
establishing the second connection with the communication server;
communicating with the first endpoint via the second connection established with the communication server;
collaborating with the first endpoint in the process to establish the direct connection with the first endpoint; and
maintaining the second connection with the communication server after the communication with the first endpoint is switched to the direct connection if such direct connection is established;
wherein the first connection, second connection, and direct connection are simultaneously maintained if the direct connection is established.

2. The system of claim 1, wherein:
the first endpoint initiates the process to establish the direct connection with the second endpoint in background without interruption to the service provided to the user.

3. The system of claim 1, wherein:
the communication server selects and informs the first, the second or both endpoints to initiate the process to establish the direct connection with the other endpoint.

4. The system of claim 1, wherein:
the first and the second endpoints continue to communicate through the first and the second connections established with the communication server without interruption if the direct connection is not established.

5. The system of claim 1, wherein:
the first and the second endpoints continues to communicate through the first and the second connections established with the communication server until one of the endpoints switches the communication over to the direct connection if such direct connection is established.

6. The system of claim 1, wherein:
the first and the second endpoints switch the communication between them back to the first and the second connections with the communication server automatically and seamlessly with no disruption if the direct connection is broken down or re-establish the first and/or the second connections with the communication server if one or more of the connections are not viable.

7. The system of claim 6, wherein:
the first and the second endpoints attempt to re-establish another direct connection between them.

8. The system of claim 1, wherein:
the first and the second endpoints switch back and forth between the direct connection and the first and the second connections with the communication server based on one or more factors.

9. The system of claim 1, wherein:
the first and the second endpoints authenticate each other before attempting to establish the direct connection.

10. The system of claim 1, wherein:
either or both of the first and the second endpoints reside in a Local Area Network (LAN) behind respective Network Address Translation devices (NATs).

11. The system of claim 10, wherein:
the first and the second endpoints establish the direct connection without going with the NATs if both endpoints reside in same LAN.

12. The system of claim 10, wherein:
the first and the second endpoints exchange their IP addresses with each other via the communication server if they reside in separate LANs.

13. The system of claim 12, wherein:
the first and the second endpoints collaborate to establish the direct connection via NAT hole punching.

14. The system of claim 1, wherein:
the switching first endpoint informs the second endpoint about the first endpoint's intention to switch the communication from the first and the second connections through the communication server to the direct connection.

15. The system of claim 14, wherein:
the switching first endpoint starts to write via the direct connection while continuing to read via the first and the second connections through the communication server until the second endpoint is informed of the first endpoint's intention to switch.

16. A computer-implemented method, comprising:
establishing a first and a second connection between a communication server and each of a first endpoint initiating a remote access to a service and a second endpoint providing such service, respectively;
using the service provided by the second endpoint via the first and the second connections established between the communication server and the first and second endpoints;
initiating a process to establish a direct connection between the first and second endpoints;
continuing to communicate through the first and the second connections between the first and second endpoints and the communication server until one of the endpoints switches the communication over to the direct connection if the direct connection is established;
maintaining the first and the second connections between the first and second endpoints and the communication server while simultaneously communicating over the direct connection.

17. The method of claim 16, further comprising:
continuing to communicate via the first and the second connections between the first and second endpoints and the communication server without disruption if the direct connection is not established.

18. The method of claim 16, further comprising:
switching the communication between the first and the second endpoints back to the first and the second connections with the communication server automatically and seamlessly with no disruption if the direct connection is broken down or re-establishing the first and/or the second connections with the communication server if one or more of the connections are not viable.

19. The method of claim 18, further comprising:
attempting to re-establish another direct connection between the first and the second endpoints.

20. The method of claim 16, further comprising:
switching back and forth between the direct connection and the first and the second connections with the communication server based on one or more factors.

21. The method of claim 16, further comprising:
initiating the process to establish the direct connection with the second endpoint in background without interruption to the service provided to the user.

22. The method of claim 16, further comprising:
selecting and informing the first or the second endpoint to initiate the process to establish the direct connection with the other endpoint.

23. The method of claim 16, further comprising:
authenticating the first and the second endpoints authenticate with each other before attempting to establish the direct connection.

24. The method of claim 16, further comprising:
establishing the direct connection between the first and the second endpoints without going with NATs if both endpoints reside in same LAN.

25. The method of claim 16, further comprising:
exchanging IP addresses of the first and the second endpoints with each other via the communication server if the endpoints reside in separate LANs;
enabling the first and the second endpoints to collaborate with each other to establish the direct connection via NAT hole punching.

26. The method of claim 16, further comprising:
switching the communication between the direct connection and the first and the second connections through the communication server without disrupting the service.

27. The method of claim 26, further comprising:
informing the non-switching endpoint about the switching endpoint's intention to switch the communication from the first and the second connections through the communication server to the direct connection.

28. The method of claim 27, further comprising:
switching the switching endpoint to start writing via the direct connection while continuing to read via the first and the second connections through the communication server until the non-switching endpoint is informed of the switching endpoint's intention to switch.

29. A machine readable medium having software instructions stored thereon that when executed cause a system to:
establish a first and a second connection between a communication server and each of a first endpoint initiating a remote access to a service and a second endpoint providing such service, respectively;
use the service provided by the second endpoint via the first and the second connections established between the communication server and the first and second endpoints;
initiate a process to establish a direct connection between the first and second endpoints;
continue to communicate through the first and the second connections between the first and second endpoints and the communication server until one of the endpoints switches the communication over to the direct connection if the direct connection is established;
maintain the first and the second connections between the first and second endpoints and the communication server while simultaneously communicating over the direct connection.

\* \* \* \* \*